(12) United States Patent
De-Gol

(10) Patent No.: US 9,468,857 B2
(45) Date of Patent: Oct. 18, 2016

(54) VEHICLE

(71) Applicant: RoboCoaster Limited, Kingswinford, West Midlands (GB)

(72) Inventor: Gino De-Gol, Heathcote (GB)

(73) Assignee: RoboCoaster Limited (GB)

( * ) Notice: Subject to any disclaimer, the term of this patent is extended or adjusted under 35 U.S.C. 154(b) by 0 days.

(21) Appl. No.: 14/389,324

(22) PCT Filed: Nov. 13, 2013

(86) PCT No.: PCT/GB2013/052989
§ 371 (c)(1),
(2) Date: Sep. 29, 2014

(87) PCT Pub. No.: WO2014/076471
PCT Pub. Date: May 22, 2014

(65) Prior Publication Data
US 2015/0246290 A1  Sep. 3, 2015

(30) Foreign Application Priority Data

Nov. 13, 2012 (GB) .................................. 1220401.2

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *A63G 31/16* | (2006.01) |
| *B25J 5/00* | (2006.01) |
| *B25J 11/00* | (2006.01) |

(52) U.S. Cl.
CPC ................ *A63G 31/16* (2013.01); *B25J 5/007* (2013.01); *B25J 11/003* (2013.01); *Y10S 901/01* (2013.01)

(58) Field of Classification Search
CPC ....... A63G 31/16; B25J 11/003; B25J 5/007; Y10S 901/01
USPC ......... 701/22, 23, 28; 901/1; 700/58, 61, 62, 700/85
See application file for complete search history.

(56) References Cited

U.S. PATENT DOCUMENTS

| | | | | |
|---|---|---|---|---|
| 6,871,596 | B2 | 3/2005 | De-Gol | |
| 2007/0257013 | A1* | 11/2007 | Bell | B23K 26/10 219/121.68 |
| 2010/0143089 | A1* | 6/2010 | Hvass | G05D 1/027 414/754 |
| 2010/0280660 | A1* | 11/2010 | Hasenzahl | B25J 9/1651 700/253 |
| 2011/0043381 | A1* | 2/2011 | Sirota | G08G 1/017 340/937 |

(Continued)

FOREIGN PATENT DOCUMENTS

WO  2013/113520 A1  8/2013

OTHER PUBLICATIONS

WO 2011/144228, Nov. 24, 2011, Bulthoff et al.*

(Continued)

*Primary Examiner* — Calvin Cheung
*Assistant Examiner* — Paula L. Schneider
(74) *Attorney, Agent, or Firm* — Brient Globerman, LLC

(57) ABSTRACT

A combined multi-axial manipulator and guided vehicle (10). The combination (10) comprises a trackless guided vehicle (12), a multi axial manipulator (14) and a carrier (16) which may be configured as a passenger module.

18 Claims, 7 Drawing Sheets

(56) References Cited

U.S. PATENT DOCUMENTS

| | | | |
|---|---|---|---|
| 2011/0218697 A1* | 9/2011 | Goldberg | B61B 3/02 701/19 |
| 2012/0098483 A1* | 4/2012 | Patel | B60L 11/182 320/108 |
| 2013/0108992 A1* | 5/2013 | Buelthoff | G09B 9/02 434/33 |
| 2013/0226344 A1* | 8/2013 | Wong | G05D 1/024 700/258 |

OTHER PUBLICATIONS

International Search Report, dated Jan. 22, 2014, from corresponding International Application Serial No. PCT/GB2013/052989.

Written Opinion of the International Searching Authority, dated Jan. 22, 2014, from corresponding International Application Serial No. PCT/GB2013/052989.

International Preliminary Report on Patentability, dated May 28 2015, from corresponding International Application Serial No. PCT/GB2013/052989.

\* cited by examiner

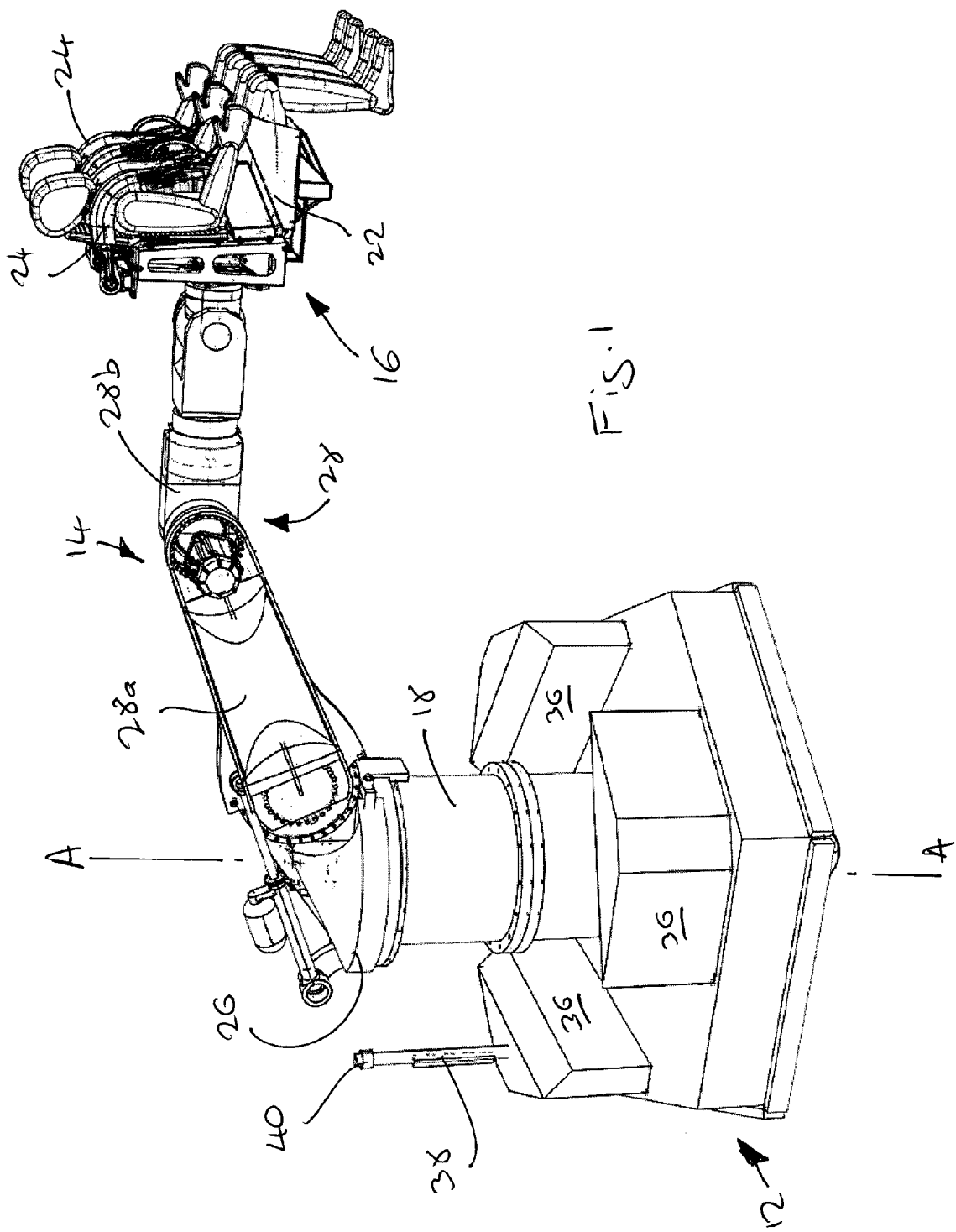

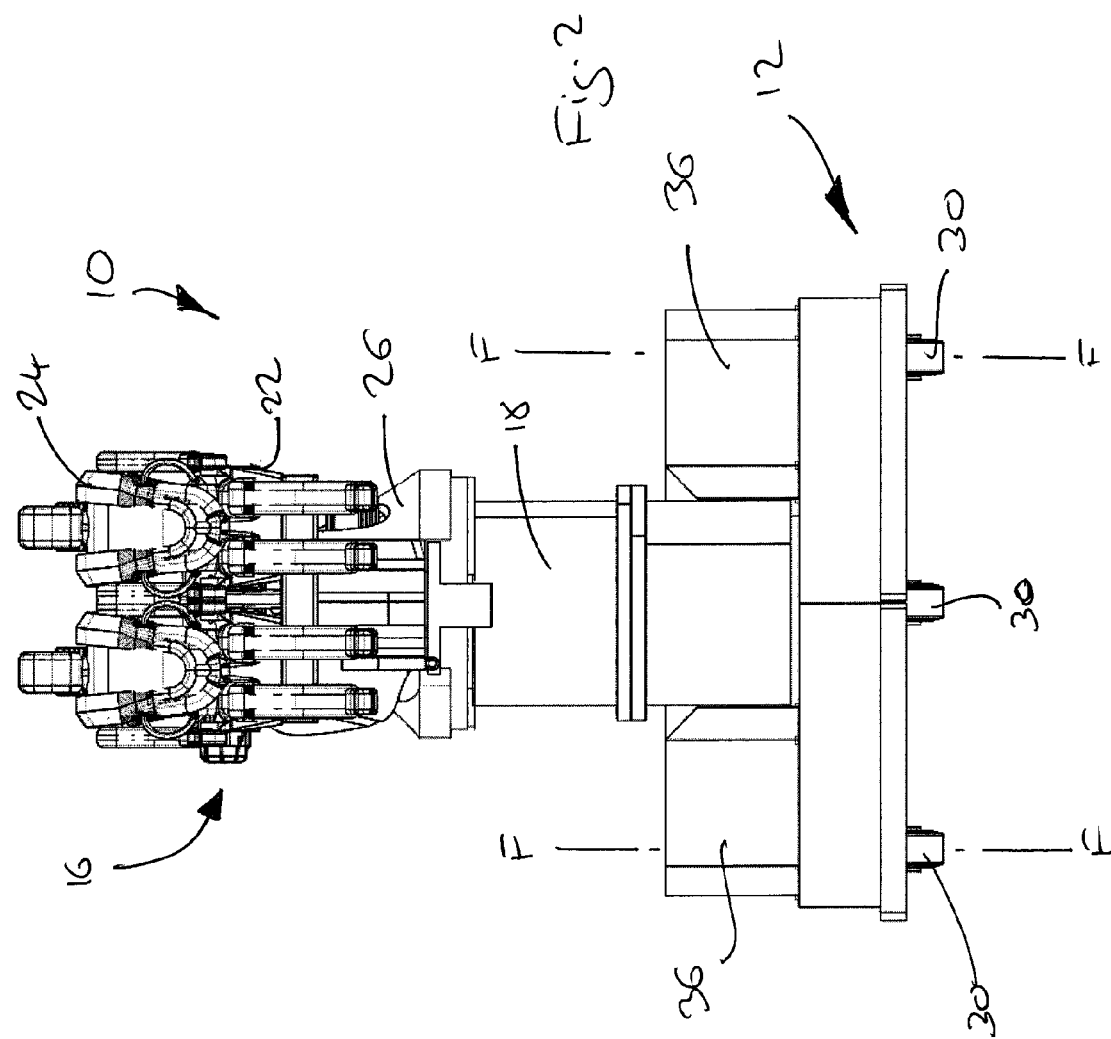

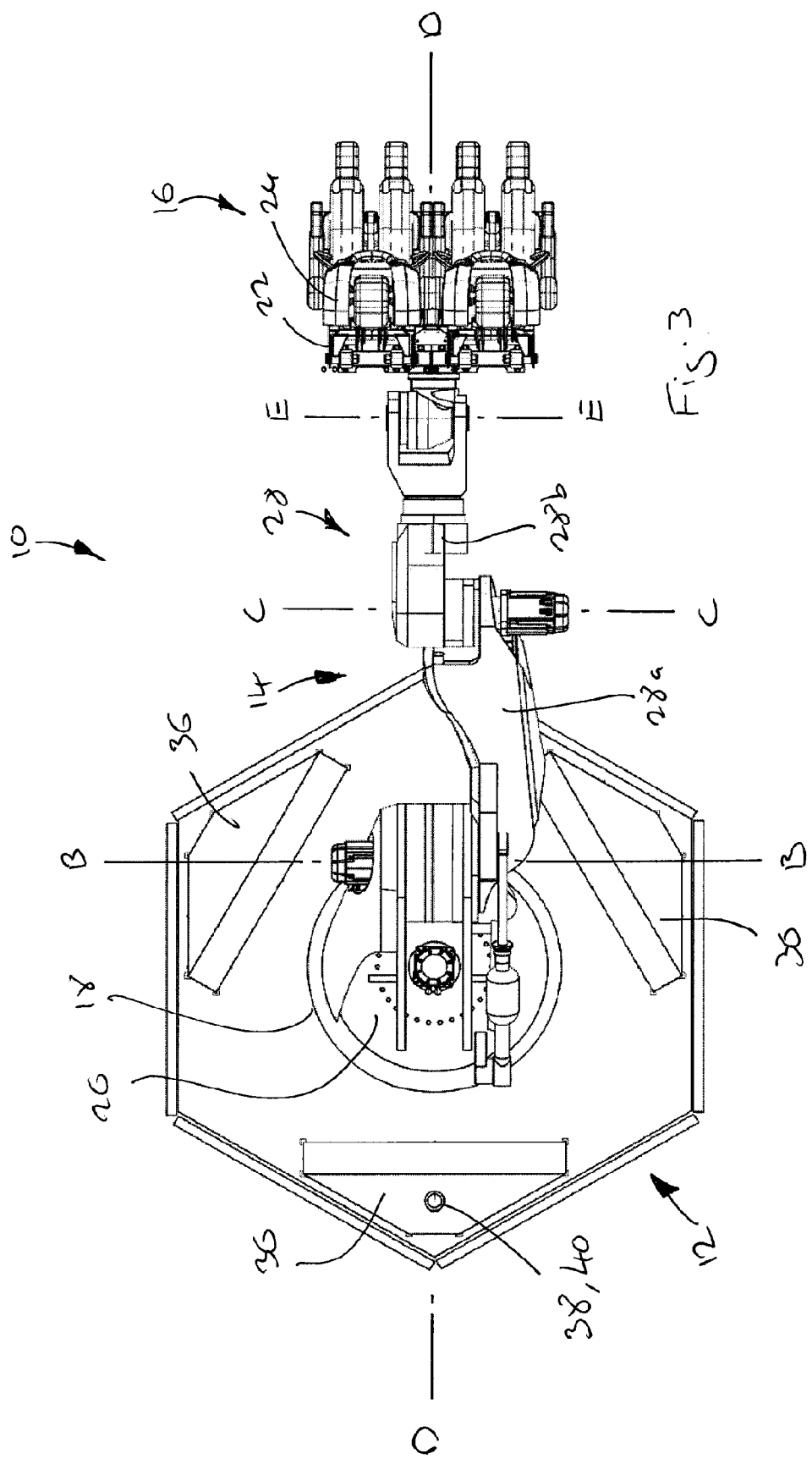

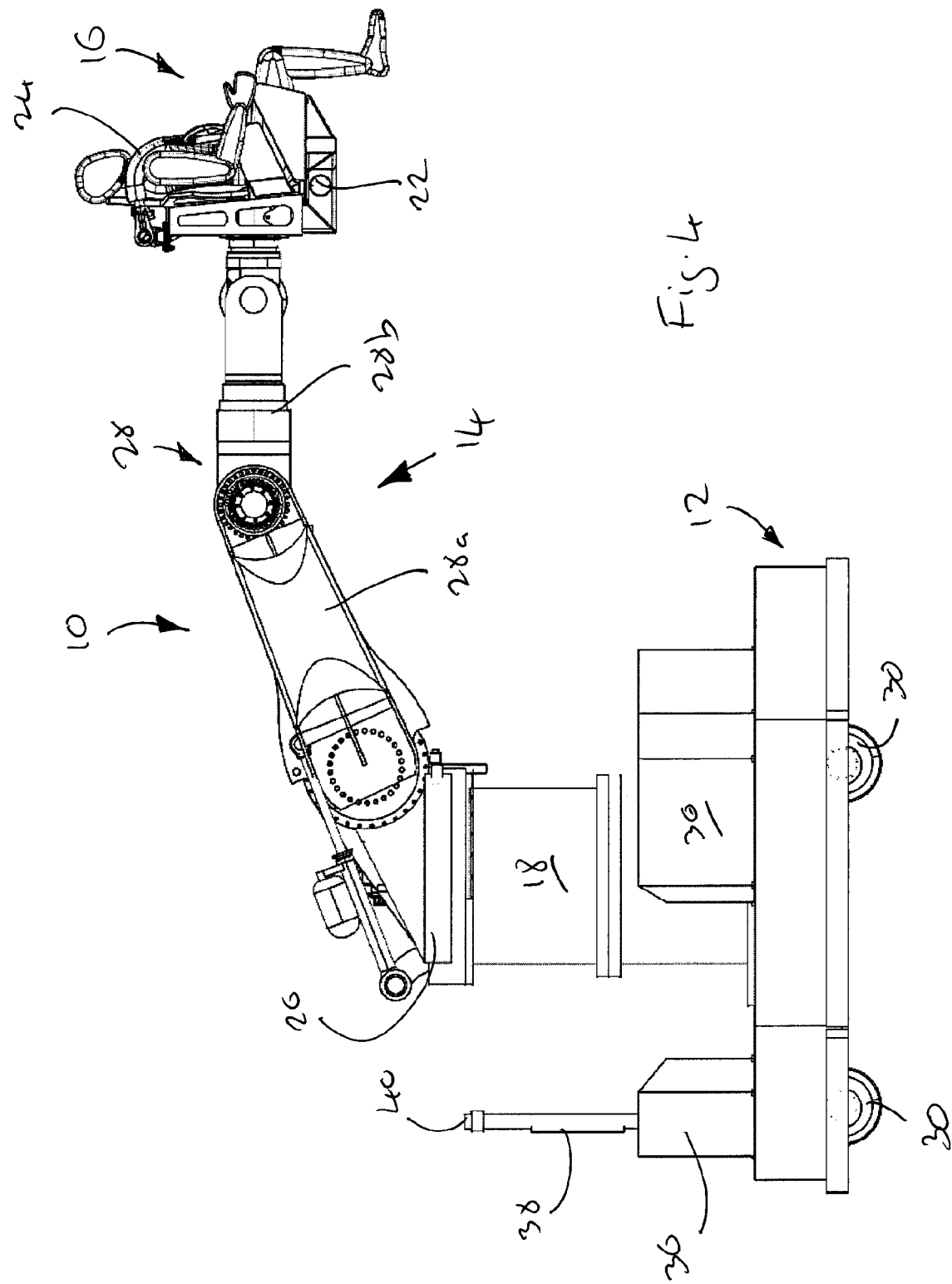

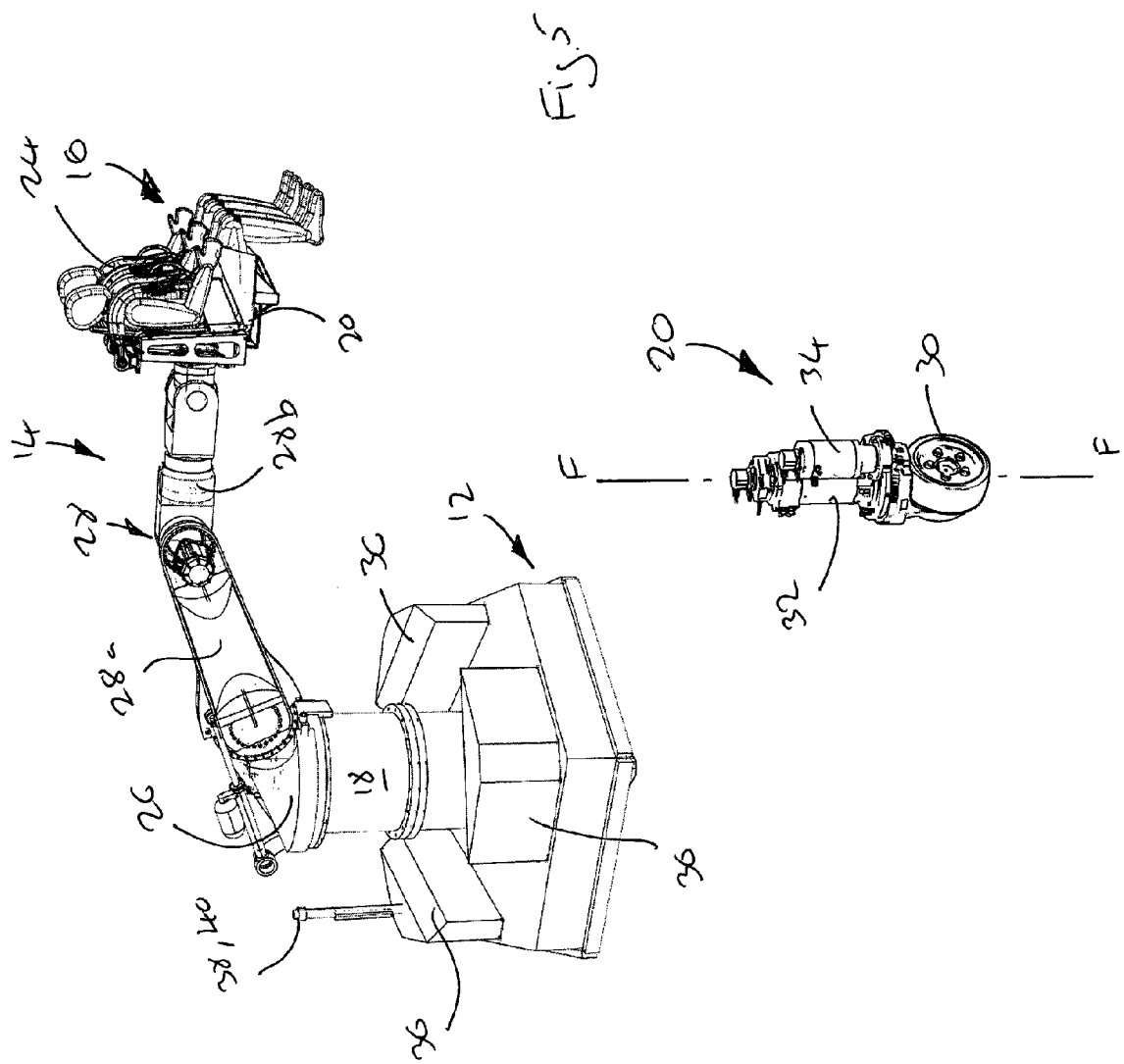

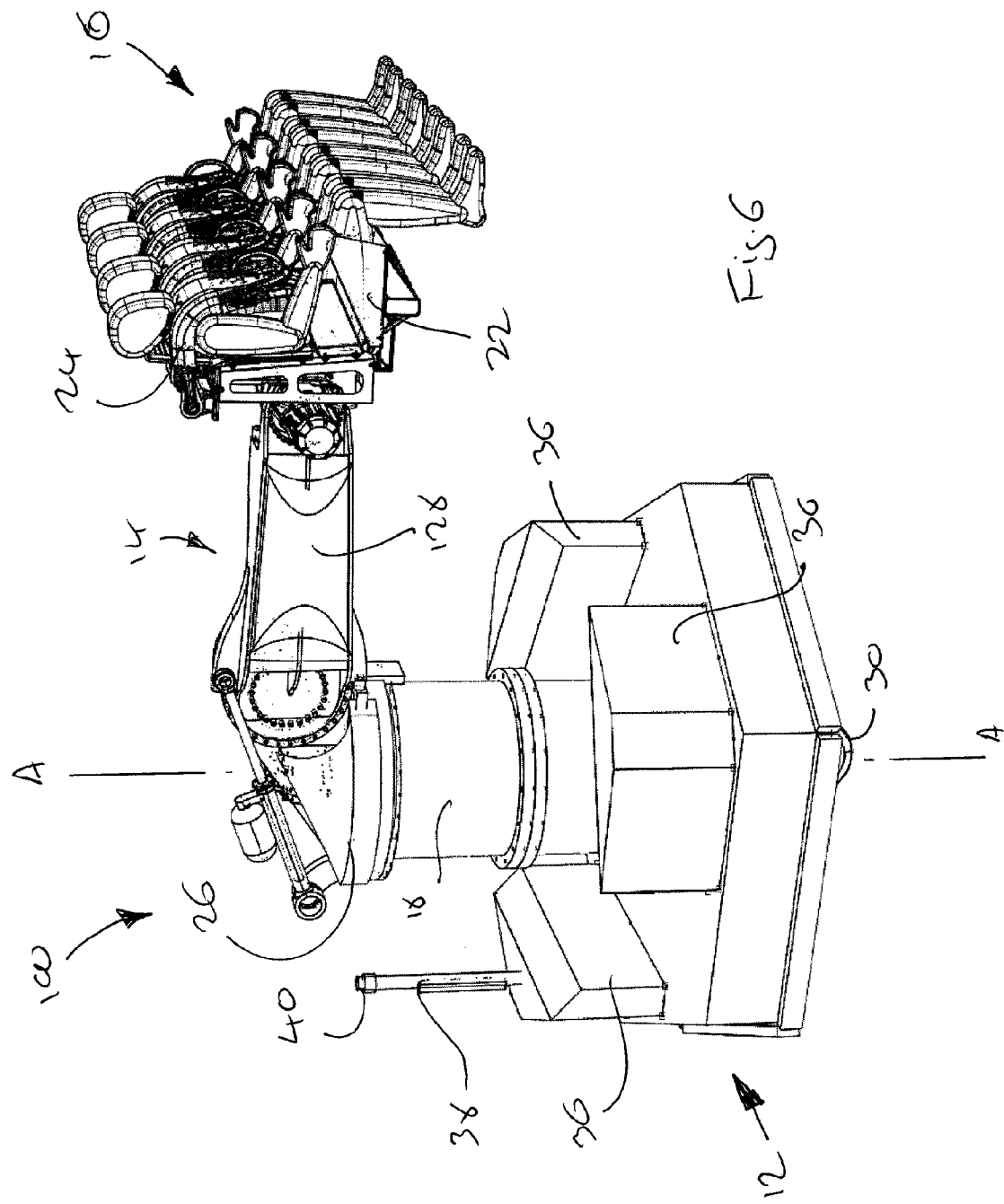

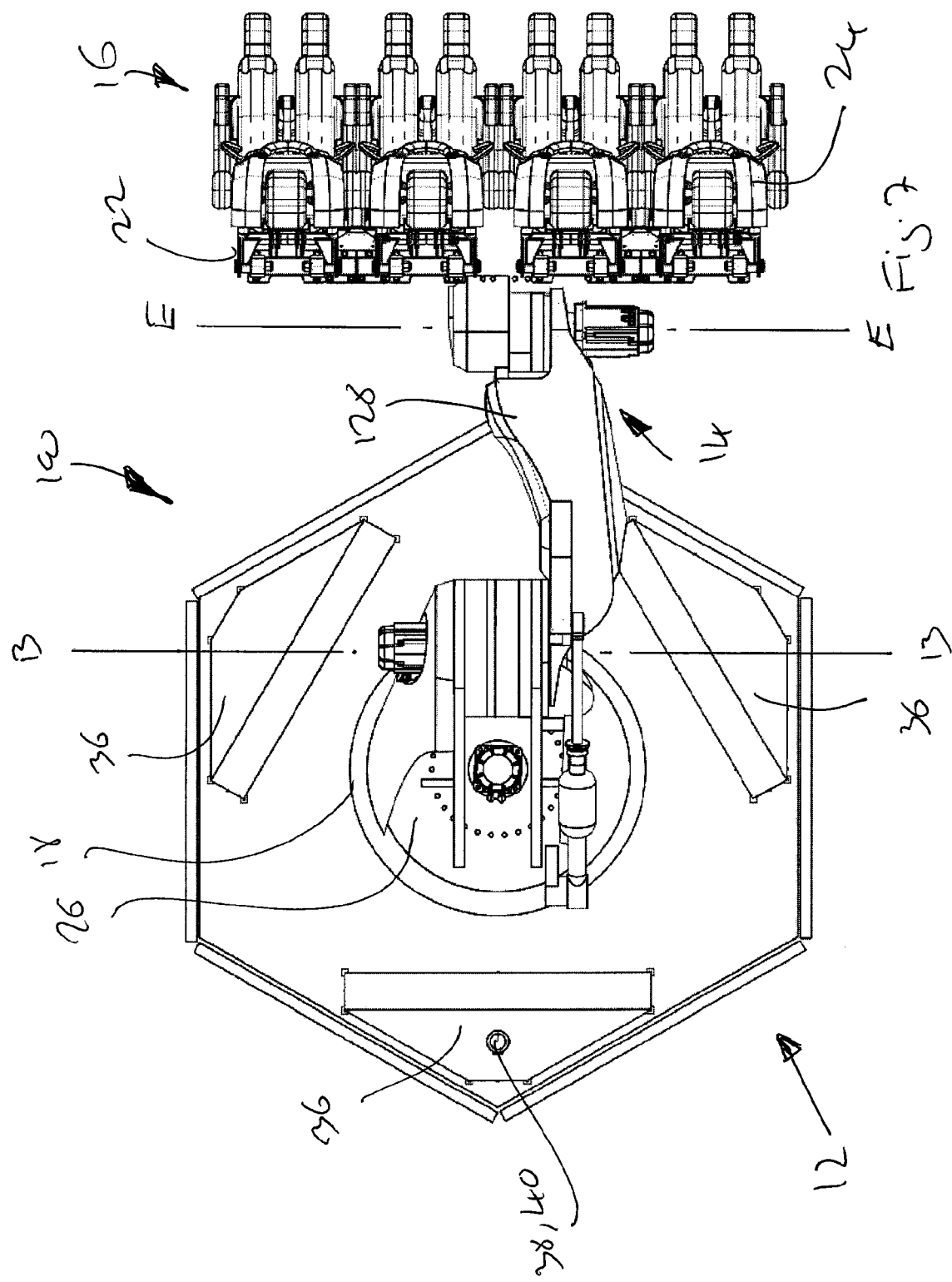

VEHICLE

CLAIM OF PRIORITY

This application is the National Stage of International Application Serial No. PCT/GB2013/052989, filed Nov. 13, 2013, which claims the benefit of United Kingdom Application Serial No. GB1220401.2, filed Nov. 13, 2012, the entire disclosures of which are incorporated by reference herein.

BACKGROUND

The present invention relates to a combined multi-axial manipulator and guided vehicle. Particularly, though not exclusively, the present invention relates to a combined multi-axial manipulator and guided vehicle for use in the industrial, simulation, medical, entertainment and/or amusement industries. The combined multi-axial manipulator and guided vehicle may be used to carry passengers. Alternatively, the combined multi-axial manipulator and guided vehicle may be used to carry equipment such as, for example, still or moving image recording apparatus, still or moving image projection apparatus, scenery or prop items, or visual effects equipment.

Passenger carrying manipulators are well known, and are exemplified in the current art by, for example, U.S. Pat. No. 6,871,596 and U.S. Pat. No. 6,776,722 and have been effectively adopted in the simulation, research, medical and entertainment industries.

The art is however limited to the motion envelope provided by the reach of the manipulator system. Such limitations had been sought to be mitigated by the addition of open or closed loop track solutions, and have proved to be successful in expanding both the operational volume and passenger capacity of such solutions. The motion range remains however restricted to the provision of complex and substantial track infrastructure to facilitate such increases in motion ranges. The provision of such track hardware additionally limits the flexibility and adaptability of such motion ranges.

The invention seeks to redress this limitation by adapting such a passenger carrying purpose with a trackless passenger moving means by incorporating a passenger carrying manipulator with a trackless guided vehicle, such that the integrated system can perform passenger-carrying operations without the limitation of such track hardware or related infrastructure.

According to the present invention there is provided an autonomously guided vehicle for use in the industrial, simulation, medical, entertainment or amusement industries comprising:

a movable base having a drive and steering system and a mounting structure for a multi axial manipulator;
a multi axial manipulator rotatably mounted to said base mounting structure and having a elongate member pivotable relative to said base mounting structure;
a carrier connected to said elongated member;
an onboard guidance system configured for autonomous motion and navigation of said base within an operational environment;
an onboard control system configured to coordinate motion and navigation of said base and movement of said multi axial manipulator.

The vehicle is autonomously guided in so far that it its movement over a surface is not defined and constrained by a physical track. Such a track may include, for example, one or more rails or channels. The vehicle preferably has a programmable control system which governs both the movement of the base and the movement of the manipulator.

The carrier may be a passenger carrier. In such an embodiment the passenger carrier may be configured so as to carry a single passenger. Alternatively, the passenger carrier may be configured so as to accommodate multiple passengers. The passenger carrier preferably includes safety restraints for the or each passenger.

In such an embodiments passenger carrier is demountable. In such an embodiment the passenger carrier may be mounted to or from the multi axial manipulator before, during and/or after a journey undertaken by the movable base The multi axial manipulator may be rotatably mounted to said base mounting structure about a first axis, and said elongate member may be pivotable relative to said base mounting structure about a second axis, said second axis being substantially parallel to said first axis. Rotation of the manipulator and pivoting of the elongate member may be synchronised with movement of the base.

The carrier may further pivotable relative to said elongate member about a third axis, said third axis being substantially parallel to said second axis.

The carrier may additionally be rotatable relative to said elongate member about a fourth axis, said fourth axis being substantially perpendicular to said third axis.

The multi axial manipulator many include a first elongate member and a second elongate member pivotably connected to said first elongate member.

The drive and steering system of the vehicle may comprises a plurality of drive and steering assemblies. Such drive and steering assemblies may be spaced around the movable base and may preferably be independently operable. Each drive and steering assembly may include a wheel and a drive motor operable to rotate said wheel. Each drive and steering assembly may further include an additional drive motor operable to rotate the drive and steering assembly relative to the base to effect steering.

Each drive and steering assembly may include a suspension arrangement.

The autonomously guided vehicle may include an onboard power source. In such an embodiment the onboard power source may consist of one or more batteries. Said one or more batteries lead acid, nickel metal hydride or lithium ion type. The batteries may preferably be located in a lower region of the base so as to act as ballast. The base may include additional ballast weights.

In an alternative embodiment the onboard power source may be a fuel cell.

Alternatively, the autonomously guided vehicle may be powered by a remote, off board power source. In such an embodiment the autonomously guided vehicle may be powered by an overhead electrified grid system with conductive floor and overhead power pick up device. Alternatively the autonomously guided vehicle may be powered by an in floor inductive power pick up device.

The onboard guidance system may be selected from the group comprising an optical tape guidance system, a laser optical guidance system, a magnetic map guidance system, an overhead reflective grid guidance system, an odometry guidance system and an on-board camera guidance system.

An embodiment of the present invention will now be described with reference to the accompanying drawings in which:

FIG. 1 shows a perspective view of a multi-axial manipulator mounted upon a trackless guided vehicle in accordance with a first embodiment of the present invention;

FIG. 2 shows a front view of the manipulator and guided vehicle of FIG. 1;

FIG. 3 shows a top plan view of the manipulator and guided vehicle of FIG. 1;

FIG. 4 shows a side view of the manipulator and guided vehicle of FIG. 1;

FIG. 5 shows a partially exploded perspective view of the manipulator and guided vehicle of FIG. 1;

FIG. 6 shows a perspective view of a multi-axial manipulator mounted upon a trackless guided vehicle in accordance with a further embodiment of the present invention; and FIG. 7 shows a top plan view of the manipulator and guided vehicle of FIG. 6.

Referring to the FIGS. 1 to 5 there is shown a combined multi-axial manipulator and guided vehicle generally designated 10. The combination 10 comprises a trackless autonomously guided vehicle (AGV) 12, a multi axial manipulator 14 and a carrier 16 which, in the embodiment shown, is a passenger module.

In the embodiment shown the trackless guided vehicle 12 is substantially hexagonal when viewed in plan. The vehicle 12 is provided with a substantially central column 18 to which the multi-axial manipulator 14 is connected. The vehicle 12 is further provided with three equidistantly spaced traction and steering units 20. The vehicle 12 may further carry a power source for the traction and steering units 20 and the multi axial manipulator 14. In the embodiment shown, the vehicle 12 is substantially hexagonal when viewed in plan. It will be understood that this shape is shown by way of example only and is not intended to limit the vehicle 12 of the invention to this shape.

The passenger module in the embodiment shown is located at the distal end of the manipulator 14. The term "distal" is used with reference to the central column 18. The passenger module comprises a pair of seats 22. Each seat 22 includes a passenger restraint arrangement 24. The passenger module 16 is shown by way of example only. In alternative embodiments of the present invention the distal end of the manipulator 14 may be provided with a carrier configured to support a desired piece of equipment. Such equipment may include, but not be limited to, still or moving image recording apparatus, still or moving image projection apparatus, scenery items, prop items, or visual effects equipment.

The manipulator 14 includes a base 26 and arm 28. The arm 28 includes a lower arm section 28a and an upper arm section 28b. The base 26 is rotationally mounted to the central column 18 and is rotatable about a first axis A-A. The lower arm section 28a is pivotably mounted to the base 26 and is pivotable relative to the base 26 about a second axis B-B. The second axis B-B is substantially perpendicular to the first axis A-A.

The upper arm section 28b is pivotably mounted to the lower arm section 28a and is pivotable relative to the lower arm section 28a about a third axis C-C. The third axis C-C is substantially parallel to the second axis B-B.

The passenger module is both pivotably and rotationally mounted to the upper arm section 28b. The passenger module is rotatable about a fourth axis D-D which is aligned longitudinally with respect to the upper arm section 28b and is perpendicular to the third axis C-C. The passenger module is further pivotable about a fifth axis E-E. The fifth axis E-E is substantially perpendicular to the fourth axis D-D.

The manipulator 14 is provided with actuators which are operable to rotate the manipulator 14 as a whole about the first axis A-A and to rotate or pivot the arm sections 28a,28b and passenger module about the second to fifth axes B-B, C-C, D-D and E-E. In the embodiment shown, the manipulator 14 includes upper and lower arm sections 28a, 28b. It will be understood that the manipulator 14 may alternatively have a single arm section or more that two arm sections.

The passenger module many be permanently fixed to the distal end of the manipulator 14. The term "permanently" is taken to mean that the passenger module is fixed to the distal end of the manipulator 14 at all times when the combined multi-axial manipulator and guided vehicle 10 is in use. This does not however discount the ability for the passenger module to be removable from the manipulator for the purposes of, for example, disassembly, servicing or maintenance of the combined multi-axial manipulator and guided vehicle 10. In an alternative embodiment, the passenger module may be releasably mounted to the distal end of the manipulator 14. In such an embodiment, the passenger module may be mounted to and/or removed from the manipulator 14 during use thereof. For example, passengers may embark upon a dismounted module at a first location. The module may then be mounted to a manipulator and conveyed thereby to a second location. Upon arrival at the second location the passenger module may be demounted from the manipulator 14 before the passengers disembark.

As noted above, the trackless guided vehicle 12 shown in the described embodiment has three equidistantly spaced traction and steering units 20. Different numbers of traction and steering units 20 may be employed in alternative embodiments. Each unit 20 is provided with a wheel 30, a first drive motor 32 and a second drive motor 34. In the embodiment shown the drive motors 32,34 are electric drive motors. The first drive motor 32 is arranged, via appropriate drive connections and gearing, to rotate the wheel 30. It will be understood that rotation of the wheels 30 of the drive and steering units 20 by the first drive motors 32, in use, effects movement of the vehicle 12 over a surface upon which it is supported. It will be appreciated that alternative traction and steering systems may be employed. For example, horizontal motor or Mecanum traction wheels may be used.

The second drive motor 34 is arranged, via appropriate drive connections, to effect rotation of the wheel 30 about a longitudinal axis F-F of the drive and steering units 20. It will be understood that such rotation of the or each drive and steering unit effects steering of the vehicle 12, in use.

In the embodiment shown, the drive and steering units 20 are located within substantially triangular shaped housings 36 of the vehicle 12. Each drive and steering unit 20 may be configured as a removable assembly including the wheel 30 and drive motors 32,34 as shown in FIG. 5. Each drive and steering unit 20 may additionally include a suspension arrangement. Such an arrangement may be included where, for example, the vehicle is intended to travel over a rough surface, minor inclinations, flooring joints or such like.

In the embodiment shown, the vehicle 12 is provided with three drive and steering units 20. It will be appreciated that in alternative embodiments the vehicle 12 may be provided with a greater number of drive and steering units 20. The vehicle 12 is further provided with a programmable control system which, in use, controls and co-ordinates operation of the drive and steering units 20 so that the vehicle 12 is able to move along an intended path. The control system preferably operates in conjunction with a guidance system of the vehicle 12. The control system may, for example, control the speed of the vehicle 12, the direction of travel of the vehicle 12 and the steering of the vehicle 12. The control system preferably also controls the operation of the manipulator 14 such that movement of the manipulator 14 is co-ordinated with movement of the vehicle 12.

The combined multi-axial manipulator and guided vehicle 10 may preferably be provided with one or more on board power sources configured to provide power to the manipulator 14, combined drive and steering units 20, control and guidance systems and any onboard safety systems that may be fitted. The combined multi-axial manipulator and guided vehicle 10 may be provided with one or more batteries. Such batteries may be located within the vehicle 12, for example within one or more of the triangular housings 36 and/or within the central column. Alternatively, the one or more batteries may be located in portions of the vehicle 12 that extend between the triangular housings 26 and the central column 18. The batteries are preferably located in a lower region of the vehicle 12 so as to act as ballast to counteract any overturning forces applied to the vehicle 12, in use, by the manipulator. The batteries may be supplemented by additional ballast in the form of, for example, lead or concrete.

The batteries may, for example, be of the lead acid, nickel metal hydride or lithium ion type. The batteries may be carried by a removable assembly which enables the batteries to be removed from the vehicle 12 for recharging and/or maintenance. In an alternative embodiment, the combined multi-axial manipulator and guided vehicle 10 may be provided with one or more on board power sources in the form of one or more fuel cells. In yet a further alternative embodiment the combined multi-axial manipulator and guided vehicle 10 may be provided with an off board power source. For example, the combined multi-axial manipulator and guided vehicle 10 may be provided with an overhead electrified grid system with conductive floor and overhead power pick up device. Alternatively, the vehicle 10 may be provided with a tangential pantograph arrangement, or a pivoting pantograph type arrangement connecting to a bus-bar to the side of the vehicle. Alternatively, the combined multi-axial manipulator and guided vehicle 10 may be provided with in floor inductive power pick up device.

The combined multi-axial manipulator and guided vehicle 10 is further provided with a guidance system. The guidance system is operable to guide the combined multi-axial manipulator and guided vehicle 10 through the environment in which it is used. In the embodiment shown the vehicle 12 is provided with a mast or turret 38 have a laser transmitter and receiver arrangement 40. The laser transmitter and receiver arrangement 40 works in conjunction with reflective markers provided within the environment within the combined multi-axial manipulator and guided vehicle 10 is intended to operate and a map stored in a memory of the control system.

It will be understood that other guidance systems may be used as an alternative to, or in addition to, the laser transmitter and receiver arrangement 40. For example, the combined multi-axial manipulator and guided vehicle 10 may include an optical tape guidance system, a magnetic map system guidance system, an overhead reflective grid guidance system, an odometry guidance system, a GPS based system, an inductive wire loop antenna arrangement and/or an on-board camera guidance system.

The combined multi-axial manipulator and guided vehicle 10 is further provided with appropriate safety systems which are operable to prevent collisions with, for example, the environment within which the combined manipulator and guided vehicle 10 is operated, or other vehicles. For example, the base 12, manipulator 14 and passenger module may be provided with proximity sensors which are connected to the combined axial manipulator and vehicle 10 control system. In the event that one or more of these sensors detects the presence of an object, then the control system can act to cease operation of the combined axial manipulator and vehicle 10. In such a circumstance, the combined axial manipulator and vehicle 10 may then be moved by the control system to a safe location to allow passengers to disembark.

The environment within which the combined axial manipulator and vehicle 10 is operable may also be provided with an appropriate safety system. For example, the environment may be provided with one or more proximity sensors. In the event that the combined axial manipulator and vehicle 10 is detected by an environment proximity sensor, then the control system can be instructed to cease operation of the combined axial manipulator and vehicle 10. In such a circumstance, the combined axial manipulator and vehicle 10 may then be moved by the control system to a safe location to allow passengers to disembark.

FIGS. 6 and 7 show an alternative embodiment of a combined multi-axial manipulator and guided vehicle generally designated 100. Features common to the embodiment described with reference to FIGS. 1 to 5 are identified with like reference numerals.

The combined multi-axial manipulator and guided vehicle 100 differs in that the multi axial manipulator 14 is provided with a single arm section 128. As before, the base 26 is rotationally mounted to the central column 18 and is rotatable about a first axis A-A. The proximal end of the arm section 128 is pivotably mounted to the base 26 and is pivotable relative to the base 26 about a second axis B-B. The second axis B-B is substantially perpendicular to the first axis A-A. The distal end of the arm section 128 is pivotably connected to the to the passenger module about a further axis E-E which is substantially parallel to the second axis B-B.

The embodiment of FIGS. 6 and 7 further differs in that it has a four seat passenger module as opposed to the two seat module shown in FIGS. 1 to 5.

While the embodiment of FIGS. 1 to 5 show a six axis manipulator, and the embodiment of FIGS. 6 and 7 show a three axis manipulator, it will be appreciated that a manipulator with a greater, lesser or intermediate number of movement axes may be used. The embodiments of the present invention further show a single manipulator mounted to a movable base. It will further be understood that multiple manipulators may be mounted on a common base.

The combined axial manipulator and vehicle 10,100 as described above may be used, for example, in the industrial, simulation, medical, entertainment and amusement industries. For the entertainment and amusement industries the combined axial manipulator and vehicle 10,100 may be operable in a themed environment. In use, the combined axial manipulator and vehicle 10,100 may convey passengers through the themed environment. The movement of the vehicle 10,100, manipulator 14 and passenger module may be synchronised with features of the themed environment for the purpose of entertaining the passengers. Features of the themed environment with which the combined axial manipulator and vehicle 10,100 may be synchronised include, but are not limited to, audio effects, visual effects, lighting effects, pyrotechnic effects, animatronics apparatuses, projections screens, stationary and/or moving prop items, water effects, smoke or vapour effects and actors.

Further features of the invention may be characterised by the following statements:

A trackless moving means for use in the industrial, simulation, medical, entertainment and amusement industries comprising:
a) at least one multi-axial manipulator further comprising:
   i) a carousel or rotary axis moveable about a first axis;
   ii) a first elongated member moveably connected to said carousel along a second axis;
b) at least one trackless guided vehicle in moveable engagement with said multi-axial manipulator further comprising:
   i) a mounting structure for a multi-axial manipulator;
   ii) one or more steering wheels;
c) at least one incorporated guidance system for autonomous motion and navigation within an operational environment; and
d) a carrier connected to said elongated member wherein said multi-axial moving means allow programmed coordinated motion means within said an operational environment.

The term "trackless" is understood to mean that the moving means does not require mechanical guidance along a track including, for example, one or more rails or channels provided on or in a surface over which the moving means is movable, in use.

A trackless moving means as described above wherein the at least one multi-axial manipulator has a second elongated member moveably connected to said first elongated member along a third axis.

A trackless moving means as described above, wherein the carrier is in moveable engagement with said first axis, said second axis and said third axis allowing up to three translational movements and up to three rotational movements of the carrier.

A trackless moving means as described above wherein the multi-axial manipulator is a robot arm.

A trackless moving means as described above wherein the multi-axial manipulator is an industrial robot adapted for the purpose.

A trackless moving means as described above wherein the trackless guided vehicle comprises two or more steering wheels that are kinematically mapped to each other thus allowing coordinated motion and steering of the combined apparatus.

A trackless moving means as described above wherein the said one or more steering wheels additionally incorporates a propulsion means.

A trackless moving means as described above wherein the said one or more steering wheels additionally incorporates a suspension system.

A trackless moving means as described above wherein the trackless guided vehicle is an autonomously guided vehicle or AGV.

A trackless moving means as described above wherein the trackless guided vehicle has three wheels kinematically mapped together for stable steering and motion dynamics.

A trackless moving means as described above wherein the trackless guided vehicle has four or more wheels equipped with a suspension system for smooth running on variable surfaces.

A trackless moving means as described above wherein the trackless guided vehicle guidance system comprises an optical tape guidance system.

A trackless moving means as described above wherein the trackless guided vehicle guidance system comprises a laser navigation system.

A trackless moving means as described above wherein the trackless guided vehicle guidance system comprises an inductive guidance system.

A trackless moving means as described above wherein the trackless guided vehicle guidance system comprises a magnetic map system guidance system.

A trackless moving means as described above wherein the trackless guided vehicle guidance system comprises an overhead reflective grid guidance system.

A trackless moving means as described above wherein the trackless guided vehicle guidance system comprises an odometry guidance system.

A trackless moving means as described above wherein the trackless guided vehicle guidance system comprises an on-board camera guidance system.

A trackless moving means as described above wherein the trackless guided vehicle guidance system comprises a guidance system incorporating any combination of the aforementioned guidance systems.

A trackless moving means as described above wherein the trackless guided vehicle incorporates a control system capable of coordinated programmable motion within an operational environment.

A trackless moving means as described above wherein the trackless guided vehicle incorporates a control system having an integrated safety system.

A trackless moving means as described above wherein the integrated safety system included a passenger activated panic switch or manually activated safety device.

A trackless moving means as described above wherein the integrated safety system includes an on-board proximity based safety system.

A trackless moving means as described above wherein the integrated safety system comprised off-board proximity based safety systems.

A trackless moving means as described above wherein the integrated safety system includes both on-board and off-board proximity based safety systems.

A trackless moving means as described above wherein the trackless guided vehicle incorporates a control system capable of programmable combinations of linear and curved path planning in said operational environment.

A trackless moving means as described above wherein multiple trackless guided vehicles are operable simultaneously in both a synchronous or asynchronous fashion in the operational environment.

A trackless moving means as described above wherein the trackless guided vehicle incorporates an on-board internal energy system.

A trackless moving means as described above wherein the trackless guided vehicle on-board energy system is a battery system.

A trackless moving means as described above wherein the on-board internal energy system is a lead acid type battery.

A trackless moving means as described above wherein the on-board internal energy system is a lead acid gel type battery.

A trackless moving means as described above wherein the on-board internal energy system is a nickel metal hydride type battery.

A trackless moving means as described above wherein the on-board internal energy system is a lithium ion type battery.

A trackless moving means as described above wherein the on-board internal energy system is a fuel cell.

A trackless moving means as described above wherein the trackless guided vehicle alternatively incorporates an off-board external energy system.

A trackless moving means as described above wherein the trackless guided vehicle off-board energy system is an overhead electrified grid system with conductive floor and overhead power pick up device.

A trackless moving means as described above wherein the trackless guided vehicle off-board energy system is an in floor inductive power pick up device.

An operational environment for a trackless moving means as described above wherein said operational environment is an enclosed facility.

An operational environment as described above whereupon the floor of the enclosed facility is a conventional concrete surface.

An operational environment as described above whereupon the floor of the enclosed facility is a finished surface such as tiled, laminated or painted surfaces or the like.

An operational environment as described above whereupon the floor of the enclosed facility is a temporary constituted from sectional floor modules such as plywood flooring, steel sheet frames or the like.

An operational environment for a trackless moving means as described above wherein said operational environment is alternatively an open or uncovered environment.

An operational environment as described above wherein the operational environment consists of a metalled or asphalt surface.

An operational environment as described above wherein the operational environment consists of an unfinished or earthen surface.

An operational environment as described above wherein the operational environment consists of an ice or frozen surface.

A trackless moving means wherein the carrier is a passenger carrier, and the passenger carrier is transferable to and from the trackless moving means A trackless moving means as described above wherein the carrier is transferable from a first trackless moving means to a second trackless moving means.

A trackless moving means as described above wherein the carrier is transferable from a first trackless moving means to tracked passenger moving device.

A trackless moving means as described above wherein the carrier is transferable from a first trackless moving means to a stationary docking device or stationary station.

What is claimed:

1. An autonomously guided vehicle for use in the industrial, simulation, medical, entertainment or amusement industries comprising:
    a movable base having a drive and steering system and a mounting structure for a multi axial manipulator;
    the multi axial manipulator rotatably mounted to said base mounting structure and having a elongate member pivotable relative to said base mounting structure;
    a passenger carrier connected to said elongated member;
    an onboard guidance system configured for autonomous motion and navigation of said base within an operational environment;
    an onboard control system configured to coordinate motion and navigation of said base and movement of said multi axial manipulator, wherein the moveable base and/or the multi axial manipulator and/or the passenger carrier are provided with proximity sensors connected to the onboard control system, and wherein the onboard control system moveable base and the multi axial manipulator in the event that one or more of the proximity sensors detects the presence of an object.

2. The autonomously guided vehicle of claim t, wherein said passenger carrier is demountable.

3. The autonomously guided vehicle of claim 1, wherein the multi axial manipulator is rotatably mounted to said base mounting structure about a first axis, and said elongated member is pivotable relative to said base mounting structure about a second axis, said second axis being substantially parallel to said first axis.

4. The autonomously guided vehicle of claim 3, wherein the carrier is pivotable relative to said elongated member about a third axis, said third axis being substantially parallel to said second axis.

5. The autonomously guided vehicle of claim 3, wherein the carrier is rotatable relative to said elongated member about a fourth axis, said fourth axis being substantially perpendicular to said third axis.

6. The autonomously guided vehicle of claim 1, wherein said multi axial manipulator has a first elongated member and a second elongated member pivotably connected to said first elongated member.

7. The autonomously guided vehicle of claim 1, wherein said drive and steering system comprises a plurality of drive and steering assemblies.

8. The autonomously guided vehicle of claim 7, wherein each drive and steering assembly includes a wheel and a drive motor operable to rotate said wheel.

9. The autonomously guided vehicle of claim 8, wherein each drive and steering assembly further includes an additional drive motor operable to rotate the drive and steering assembly relative to said base to effect steering.

10. The autonomously guided vehicle of claim 7, wherein each drive and steering assembly includes a suspension arrangement.

11. The autonomously guided vehicle of claim 1, wherein the autonomously guided vehicle includes an onboard power source.

12. The autonomously guided vehicle of claim 11, wherein the onboard power source is one or more batteries.

13. The autonomously guided vehicle of claim 12, wherein said one or more batteries is selected from a battery type consisting of lead acid, nickel metal hydride or lithium ion.

14. The autonomously guided vehicle of claim 11, wherein the onboard power source is a fuel cell.

15. The autonomously guided vehicle of claim 1, wherein the autonomously guided vehicle is powered by a remote, off board power source.

16. The autonomously guided vehicle of claim 15, wherein the autonomously guided vehicle is powered by an overhead electrified grid system with conductive floor and overhead power pick up device.

17. The autonomously guided vehicle of claim 15, wherein the autonomously guided vehicle is powered by an in floor inductive power pick up device.

18. The autonomously guided vehicle of claim 1, wherein the onboard guidance system is selected from a group comprising an optical tape guidance system, a laser optical guidance system, a magnetic map guidance system, an overhead reflective grid guidance system, an odometry guidance system and an onboard camera guidance system.

* * * * *